United States Patent [19]

Takahashi et al.

[11] 4,360,824
[45] Nov. 23, 1982

[54] SYSTEMS FOR RECORDING BOTH INFORMATION AND PILOT SIGNALS DIRECTLY ON RECORDING MEDIUM

[75] Inventors: Nobuaki Takahashi, Yamato; Kazunori Nishikawa, Machida; Isao Masuda, Sagamihara; Hideo Sato, Yokohama, all of Japan

[73] Assignee: Victor Company of Japan, Ltd., Yokohama, Japan

[21] Appl. No.: 123,117

[22] Filed: Feb. 21, 1980

[30] Foreign Application Priority Data

Feb. 23, 1979 [JP] Japan .................................. 54-19777

[51] Int. Cl.³ ............................................. H04N 5/76
[52] U.S. Cl. .................................... 358/323; 358/343; 360/32; 369/47; 369/59
[58] Field of Search ............. 358/4, 127, 128.5, 128.6; 360/8, 32, 19

[56] References Cited

U.S. PATENT DOCUMENTS 4,206,476  6/1980  Hashimoto .......................... 360/8 X
4,208,671  6/1980  Ozawa et al. ........................... 358/4

FOREIGN PATENT DOCUMENTS 2715573  10/1977  Fed. Rep. of Germany ... 358/128.5

OTHER PUBLICATIONS

"A New Look-Ahead Code for Increased Data Density," Jacoby, IEEE Transactions on Magnetics, vol. Mag-13, No. 5, Sep. 77, pp. 1202-1204.
"A Long Play Digital Audio Disk System," Doi, Itoh, Ogawa, Journal of the Audio Engineering Society, Dec. 1979, vol. 27, No. 12, pp. 975-981.

Primary Examiner—Stuart N. Hecker
Attorney, Agent, or Firm—Louis Bernat

[57] ABSTRACT

An information signal recording system comprises a circuit for generating pilot signals for tracking control, a circuit for generating a rectangular waveform signal of a specific frequency existing in an artificial synchronizing signal duration in every specific period and having almost no frequency component equal to and in the vicinity of the frequencies of the pilot signals, a circuit for pulse code modulating or difference modulating an information signal, further digital modulating the information signal, and obtaining a digital information signal existing in a time interval other than the artificial synchronizing signal duration. The digital information signal is recorded along a main track on a recording medium and the pilot signals are recorded along pilot signal tracks contiguous to the main track.

6 Claims, 15 Drawing Figures

SYSTEMS FOR RECORDING BOTH INFORMATION AND PILOT SIGNALS DIRECTLY ON RECORDING MEDIUM

BACKGROUND OF THE INVENTION

The present invention relates generally to systems of the type wherein an information signal and pilot signals are recorded directly on a rotating recording medium. More particularly, the invention relates to a system in which a main information signal is recorded directly along a main information track in a period wherein pilot signals are recorded along pilot signal tracks in a manner such that there is no interference disturbance between the main information signal and the pilot signals.

A new "Information signal recording and reproducing system" disclosed in the specification of U.S. patent application Ser. No. 785,095, now U.S. Pat. No. 4,331,976, of which assignee is the same as that of the present application has been developed and reduced to practice. According to this developed system, in the recording system thereof, pits are formed in accordance with the main information signal such as television video signal, being recorded along a spiral track on a recording medium of flat disc shape, without forming a groove therein, and, in the reproducing system, a reproducing stylus traces over and along this track thereby to reproduce the recorded information signal. In this developed system, pilot or reference signals are recorded on or in the vicinity of a track of the information signal such as video signal on a rotary disc. At the time of reproducing, the information signals are reproduced together with the video signal, and tracking servo control is carried out so that the reproducing stylus traces accurately along the track in response to the reproduced reference signals.

By the use of this developed system, since the recording track has no groove, there is no possibility whatsoever of the reproducing stylus or the recording medium being damaged, and the stylus can trace the same portion of the track repeatedly a plurality of times, whereby a special reproduction such as still, slow motion, or quick motion reproduction becomes possible.

In the above described system, in order not to produce any disturbance relative to the information signal, the pilot signals are recorded during a period corresponding to, for example, the horizontal synchronizing signal duration of a television video signal. Then, in the case where, with the use of the above described system, an information signal and an audio signal are recorded, in order to make possible reproduction with interchangeability with a recording medium on which a television video signal has been recorded as an information signal, the pilot signal is recorded in the time interval (hereinafter referred to as an artificial horizontal synchronizing signal duration) corresponding to the horizontal synchronizing signal of the television video signal. The audio signal to be recorded is rendered into a digital signal by modulation such as pulse code modulation (PCM) or difference modulation and is further digital modulated (encoded) by a digital modulation method such as modified frequency modulation (MFM).

The recording operation has heretofore been carried out by frequency modulating the carrier wave with the information signal. For this reason, in the case where there are two channels for the audio signal, the audio signal can be readily recorded on and reproduced from the recording medium with a broad dynamic range and high quality. However, when the number of channels of the audio signal becomes, for example, four channels, the transmission bit rate becomes twice that in the case of two channels. For this reason, the frequency of the carrier wave in this case must be set at a considerably high value at the time of frequency modulation, and a considerably wide band is required for recording and reproducing. In actual practice, however, there is a limit to the width of the recording/reproducing band owing to the characteristics of the recording medium itself and the organizations of the recording apparatus and the reproducing apparatus.

Furthermore, even in the case of two audio signal channels, if, for example, the recording medium of disc shape is designed with a small diameter, and an audio signal of the same time content as in the case of a large diameter is recorded on this small medium, the signal recording/reproducing band cannot be made very wide.

In such cases, a possible solution appears to be the direct recording of a signal obtained by digital modulation without carrying out frequency modulation at the time of recording. When such a direct recording method is used, the required band for recording and reproducing is not as wide as that required in the case where the frequency-modulation method is used. For this reason the above described problem is solved.

However, when the signal obtained by digital modulation is recorded directly in this manner, an undesired frequency component becomes present in the frequency spectrum of the recorded and reproduced signal down to a low-frequency zone including a frequency which is the same as the pilot signal frequency as will be described hereinafter in detail in conjunction with a drawing. For this reason, this undesired frequency component and the pilot signal mutually interfere, whereby the recording and reproducing characteristics deteriorate, and tracking control of the reproducing stylus in the reproducing system cannot be carried out stably in some cases.

Accordingly, a measure which appears to be a solution for this problem comprises compressing the digital modulated signal in time base so that it will not be present in the artificial horizontal synchronizing signal duration and rendering it into a block in every period corresponding to one horizontal scanning period so as to prevent the above mentioned mutual interference. However, when an information signal is prevented from being present in the artificial horizontal synchronizing signal duration in this manner, it is difficult to cause a clock signal for demodulation in the reproducing system to synchronize with a clock signal for modulation in the recording system. Furthermore, since a part in which a signal does not exist is added to the digital signal having two values, the recording becomes one of a total of three values. In this case, signal transmission cannot be carried out as stably as in the case of recording of only two values. Still another problem is that a wide frequency range is required for the signal transmission.

SUMMARY OF THE INVENTION

Accordingly, it is a general object of the present invention to provide a novel and useful information signal recording system in which the above described difficulties and problems have been overcome.

Another and specific object of the invention is to provide a system which records a signal such that, during an artificial horizontal synchronizing signal duration in which a pilot signal is recorded on the pilot signal track, an undesired frequency component which would interfere with the pilot signal frequency is not produced in the vicinity of the pilot signal frequency on the main track.

Other objects and further features of the present invention will be apparent from the following detailed description when read in conjunction with the accompanying drawings.

BRIEF DESCRIPTION OF THE DRAWINGS

In the drawings:

FIGS. 6(A) and 6(B) are waveform charts respectively showing the waveforms of a recording main information signal and a pilot signal according to the system of the invention;

DETAILED DESCRIPTION

Figures 1, 8:
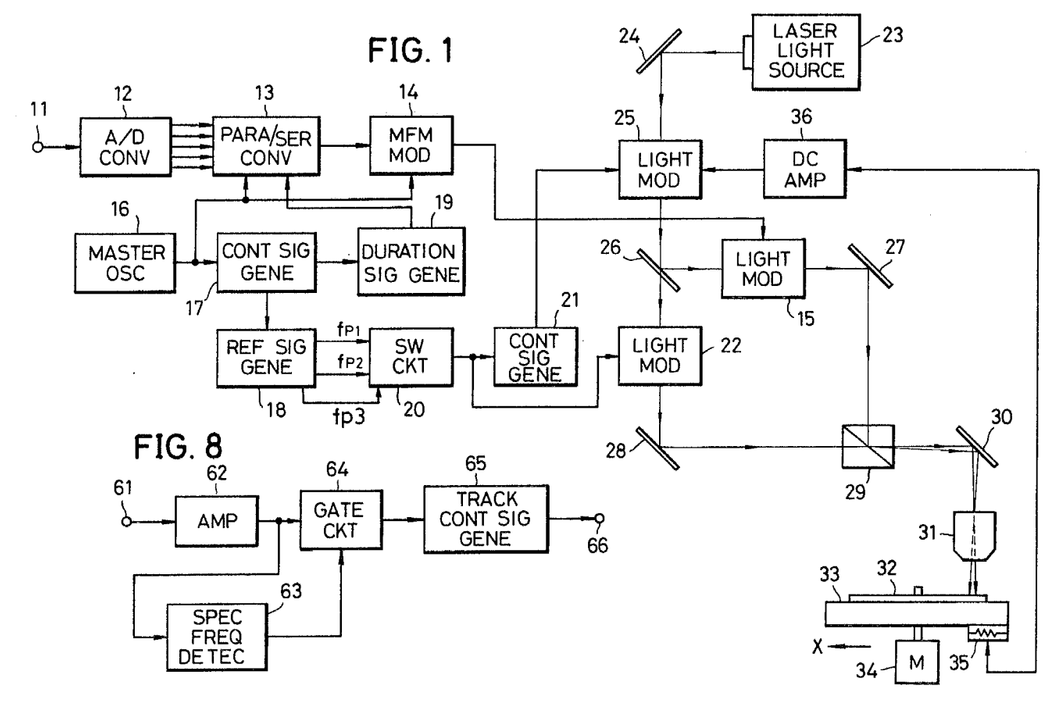
FIG. 1 is a block schematic diagram of one embodiment of the information signal recording system according to the present invention.
FIG. 8 is a block schematic diagram of one example of a reproducing system for reproducing signals from a recording medium on which the signals have been recorded by the system of the invention.

Referring first to FIG. 1, an analog audio signal is applied to an input terminal 11 of the system and is fed to an analog-to-digital (A/D) converter 12, where it is converted into parallel digital signals. These parallel digital signals are supplied to a parallel-series conversion circuit 13, where they are parallel-series converted through the use of a clock signal from a master oscillator 16. From this, a signal which has been pulse code modulated (PCM signal), for example, is led out and supplied to a modulator 14, where, by the use of the clock signal from the master oscillator 16, it is digital modulated (encoded) by, for example, modified frequency modulation (MFM).

Alternate modes of modulation are possible. For example, instead of PCM difference modulation may be used. Instead of MFM, a digital modulation mode such as non-return-to-zero (NRZ), non-return-to-zero inverted (NRZI), phase encoding (PE), group coded recording (GCR), and 3-position modulation (3PM) may be used. The output rectangular wave of the modulator 14 is applied as a modulation signal directly to a light modulator 15 without being frequency modulated.

Here, in the case where, for example, the input PCM signal of the modulator 14 is a signal wherein the logical values are all "1" (unity) as indicated in FIG. 2(A), the output MFM signal thereof becomes a rectangular wave as indicated in FIG. 2(B). More specifically, the frequency of the MFM signal becomes a frequency which is one half of the frequency (which is equal to the frequency of the digital signal indicated in FIG. 2(A)) of the clock pulses from the master oscillator 16. Therefore, in the case where the clock pulse frequency is 6.4 MHz, the output MFM signal is a signal of a signal frequency of 3.2 MHz. The frequency spectrum of the MFM signal is as indicated in FIG. 2(C). In addition to the fundamental wave of a frequency of a tertiary higher harmonic wave of a frequency of 9.6 MHz, a quinary higher harmonic wave of a frequency of 16 MHz, ... higher harmonic waves of orders of $(2m=1)$ (where m is 3 or an integer greater than 3).

In the case where, for example, the input PCM signal of the modulator 14 is a signal in which, as indicated in FIG. 3(A), the logical values are alternate repetitions of "1" and "0," the output MFM signal thereof is a rectangular wave as indicated in FIG. 3(B). The frequency of this MFM signal becomes $\frac{1}{4}$ of the clock pulse frequency. Therefore, its frequency spectrum, as indicated in FIG. 3(C), has in the case of clock pulse frequency of 6.4 MHz, a fundamental wave of a frequency of 1.6 MHz, a tertiary higher harmonic wave of 4.8 MHz, a quinary higher harmonic wave of 8.0 MHz, ... and higher harmonic wave components of higher odd-number order.

Thus, when the repeated frequency of the output MFM signal of the modulator 14 is a single frequency, this repeated frequency is the fundamental wave, and a component of a frequency lower than this does not exist.

Figure 4:
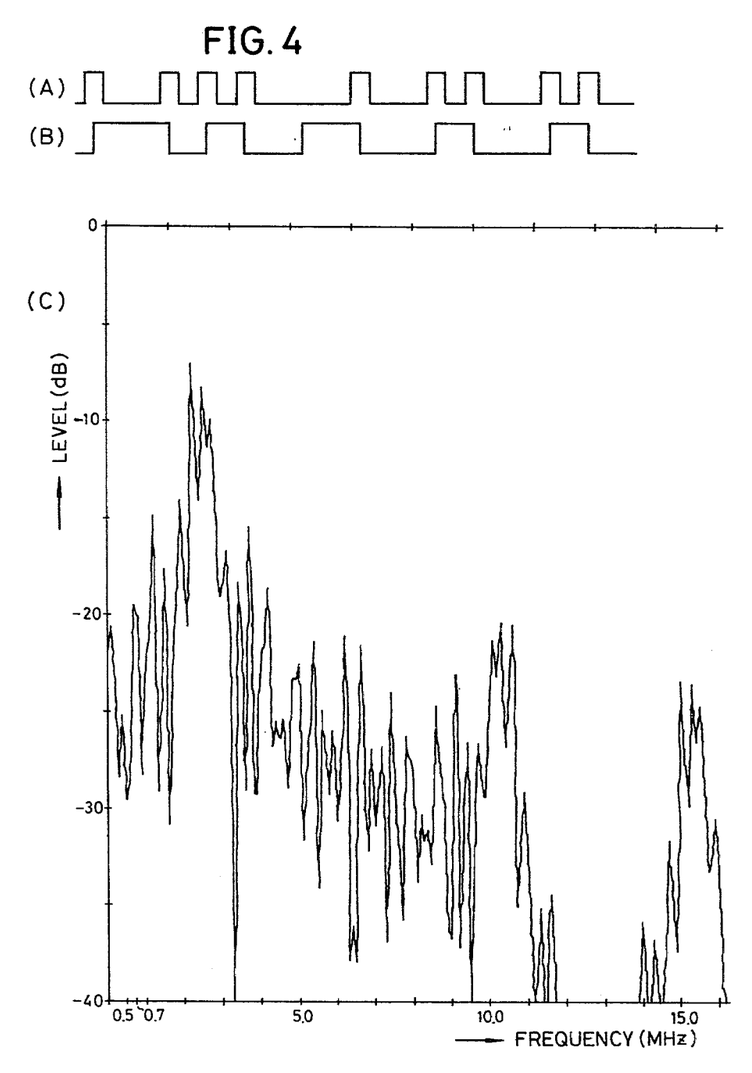
FIGS. 4(A) and 4(B) are waveform charts respectively showing a PCM signal waveform and an MFM signal waveform in the case where the logical values of the PCM signal are random.
FIG. 4(C) is a graph indicating the frequency spectrum of the modulator output in the same case as in FIGS. 4(A) and 4(B)

Actually, however, the PCM signal applied as input to the modulator 14 is varying in response to the audio signal applied to the input terminal 11. As a consequence, the variation of the logical values is a random digital signal as indicated in FIG. 4(A). When a PCM signal of this character is introduced as input into the modulator 14, the waveform of its output MFM signal becomes as indicated in FIG. 4(B). In the case of a clock pulse frequency of 6.4 MHz, for example, this waveform comprises a combination of rectangular waves of frequencies of 1.6 MHz, 2.13 MHz, and 3.2 MHz. The frequency spectrum of a signal of this character is as indicated in FIG. 4(C) and includes a component of considerably low frequency.

On the other hand, the pilot signals for tracking described hereinafter have the same frequencies (511.4 KHz and 715.9 KHz in the present embodiment of the invention) as the pilot signals used for the recording medium on which the video signal is recorded (hereinafter referred to as the video disc) so that the recording medium recorded by the system of the present invention can be interchangeably reproduced also by the apparatus for reproducing the video disc. The signal of the frequency spectrum shown in FIG. 4(C), however, has frequency components which are the same as the frequencies of the above mentioned pilot signals and frequencies in the vicinity thereof. For this reason, if the aforementioned MFM signal and the pilot signals were respectively recorded on and reproduced from the main track and pilot signal tracks contiguous thereto or partially overlapping the main track, interference would occur between the pilot signals and the above mentioned frequency components. Accordingly, in the recording system of the present invention, occurrence of this interference is prevented in the manner described hereinafter.

A single-frequency signal of high frequency from the master oscillator 16 is supplied to a control signal generator 17, where a control signal having the horizontal scanning period of the television video signal or a period close thereto is generated. This control signal is supplied to a pilot signal generating circuit 18 and to a duration signal generating circuit 19 for generating a signal (hereinafter referred to as a duration signal) of a time period or duration corresponding to the horizontal synchronizing signal duration.

The pilot signal generating circuit 18 generates in a tone-burst state first and second pilot signals fp1 and fp2 of mutually different single frequencies every period of a duration corresponding to the horizontal scanning duration of the video signal and, moreover, only within the artificial horizontal synchronizing signal duration which is equal to the difference obtained by subtracting a duration corresponding to the existence of a colorburst signal from the horizontal blanking duration. The frequencies of these first and second pilot signals fp1 and fp2 are selected at values which are respectively the same as those of the first and second pilot signals used for the above mentioned video disc in consideration of the interchangeability therewith. As one example of these frequencies, the frequencies of the pilot signals fp1 and fp2 are selected at values which are respectively 1/5 and 1/7 of the chrominance sub-carrier frequency 3.58 MHz of the color video signal, that is, 715.9 KHz and 511.4 KHz. In addition, the pilot signal generating circuit 18 produces as output a third pilot signal fp3 every one-revolution period of a recording original disc 32 described hereinafter. The third pilot signal fp3 is generated at the time when the first pilot signal fp1 (or the second reference signal fp2) is switched to the second pilot signal fp2 (or the first reference signal fp1), which occurs after every complete one-revolution period of an original recording disc 32. This third pilot signal fp3 is a switching control signal used for alternately exchanging the signal fp1 (or the signal fp2) for the signal fp2 (or the signal fp1), which input the two terminals of the differential amplifier (not shown in FIG. 1) of the tracking servo circuit.

The pilot signals fp1, fp2, and fp3 thus generated are supplied to a switching circuit 20, through which the pilot signal fp3 passes as it is, and in which the pilot signals fp1 and fp2 are alternately switched every one-revolution period of the recording original disc 32 and are thus alternately supplied successively to a light quantity control signal generating circuit 21 and a light modulator 22.

The duration signal produced as output by the duration signal generating circuit 19 is supplied to the parallel-series conversion circuit 13. This parallel-series conversion circuit 13 operates in response to the duration signal to convert a continuous information digital signal introduced thereinto as input into a series digital signal which has been compressed in time base so that, for every horizontal scanning duration, this information digital signal does not exist in the duration corresponding to the horizontal synchronizing signal and exists at other times, and which, moreover, is so adapted that, in this horizontal synchronizing signal duration, a digital signal of a single-frequency signal exists.

A laser light beam emitted from a laser light source 23 is reflected by a mirror 24 and passed through a light modulator 25 for light quantity adjustment. The light beam thus adjusted is projected onto a half mirror 26, which transmits one part of the light to a light modulator 22 and reflects another part thereof to another light modulator 15. The output MFM signal from the modulator 14 is supplied as a main information signal to the above mentioned light modulator 15 to modulate the light beam reflected by the half mirror 26. The resulting output is projected as a first modulated light beam onto a mirror 27, by which it is reflected, and is passed through a polarizing prism 29. The light thus transmitted through the prism 29 is reflected by a mirror 30, passes through an objective lens 31, and is brought to a focus on a photo-sensitive agent applied as a coating on a recording original disc 32 made of material such as glass, and is recorded on the main track. The light beam which passes through the aforementioned half mirror 26 is modulated in the light modulator 28 by the above mentioned pilot signals, and the resulting output is introduced into the polarizing prism 31 as a second modulated light beam, and is reflected by the mirror 30, passes through the objective lens 31, and is focussed on the recording original disc 32 and is recorded on the pilot signal track.

The original disc 32, which is mounted on a turntable 33, is rotated at a rotational speed of 900 rpm. by a motor 34. The original disc 32, turntable 33, and motor 34 are unitarily and continuously transported at a specific pitch in the arrow direction X by a transporting mechanism (not shown). As a result, the aforementioned MFM signal and the pilot signals are recorded along a spiral track on the original disc from its outer periphery toward its central part respectively by the first and second modulated light beams.

Furthermore, a displacement position detector 35 comprising a potentiometer is provided to detect the displacement position due to the above described transporting movement as the original disc 32 and the turntable 33 are transported in the above mentioned arrow direction X and to produce as output a DC voltage responsive to the displacement position. This detected DC voltage is passed through a DC amplifier 36 and applied to the aforementioned light modulator 25 for light quantity adjustment thereby to control the intensity of the light beam from the laser light source 23 in responsive accordance with the position in the radial direction of the original disc 32 of the light beam spot forcussed on the disc 32. By this arrangement and operation of the recording apparatus, compensation is provided so as to eliminate the effect of difference in relative linear speed due to the position of the light beam spot in the radial direction of the original disc 32.

The light quantity control signal generating circuit 21 operates to generate a control signal for decreasing the intensity of the laser beam from the laser light source 23 only in the periods wherein the pilot signals exist relative to the laser beam intensity in the other periods and to supply this control signal to the light modulator 25 for light quantity adjustment. As a result, the beam intensity of the light beam which has passed through the light modulator 25 in the periods corresponding to the periods wherein the pilot signals exist has been decreased relative to the beam intensity thereof in the other periods, whereby recording is carried out in uniform state entirely.

The original disc 32 exposed to light in the above described manner is subjected to a known developing process and to a known disc fabricating process, whereupon a completed recorded disc is obtained. The recorded disc comprises, for example, a disc substrate made of polyvinyl acetate (PVAC), in which the pits are formed in the spiral track, a metal coating formed on the disc substrate to constitute an electrode, and a dielectric coating film adhered onto the metal coating. The disc may be caused to possess an electrode function by using another material instead of providing a metal coating film.

Here, as described hereinabove, the logical values of the output MFM signal of the modulator 14 are varying at random, in general, and the frequency spectrum thereof is as indicated in FIG. 4(C). Accordingly, this signal has components of the same frequency as the frequencies 715.9 KHz and 511.4 KHz of the above described first and second pilot signals fp1 and fp2. Moreover, the pilot signals are recorded with a recording level that has been lowered by approximately 20 dB relative to the recording level of the MFM signal as the main information signal so that, as mentioned above, the entire recording will be carried out uniformly. Therefore, as is apparent also from FIG. 4(C), when the pilot signals and the MFM signal are simultaneously recorded on tracks that are partially mutually overlapped, the low-frequency components of the recording level of the pilot signals and recording level of the MFM signal become substantially of the same order, and the pilot signals cannot be normally reproduced.

Figures 5, 6, 7:
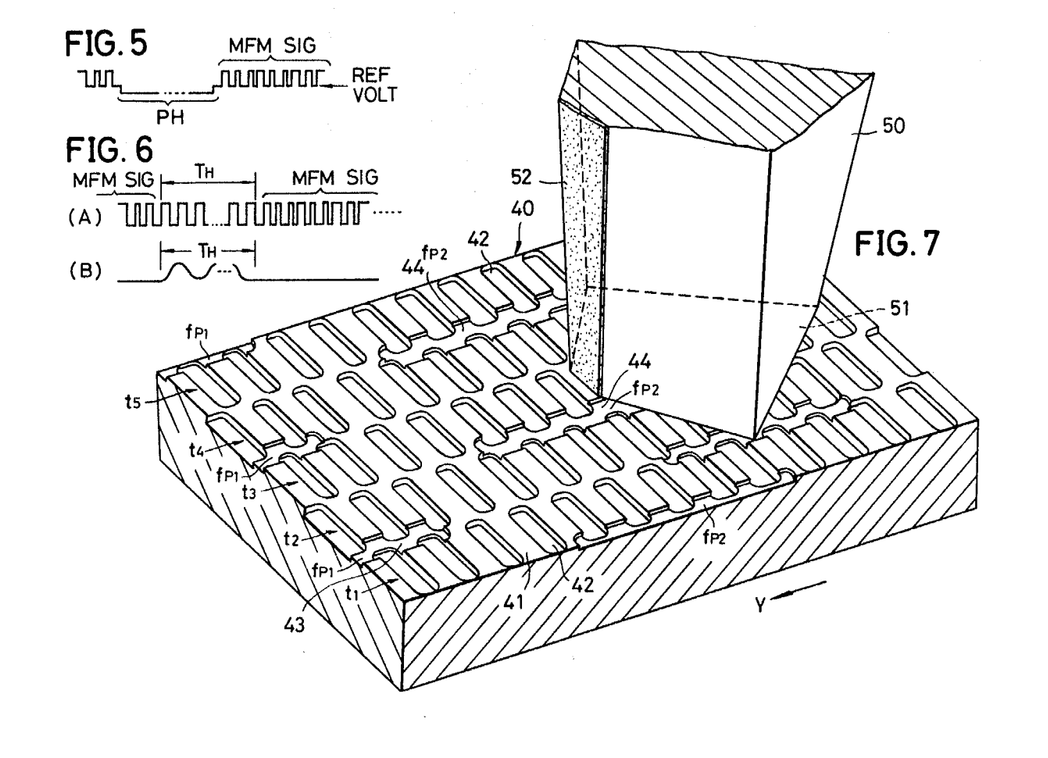
FIG. 5 is a waveform chart showing the waveform of a digital signal conforming to a conventional video signal format.
FIG. 7 is an enlarged perspective view showing the state of a reproducing stylus tracing a recording medium on which signals have been recorded by the system of the invention.

Accordingly, one measure for overcoming this problem is considered to prevent the MFM signal from existing in the horizontal synchronizing signal duration PH as indicated in FIG. 5 and to record the pilot signals on the pilot signal tracks in this duration PH in conformance with the format of the video signal. However, a signal corresponding to the horizontal synchronizing signal in this duration PH is recorded on the negative side from the reference voltage REF VOL, and the logical value 1 of the MFM signal is recorded on the positive side. However, the stable reproduction of this reference voltage is more difficult in the case of a direct recording system than in the case of a frequency modulation system. Moreover, the horizontal scanning frequency in a video format of a color video signal of an NTSC system, for example, is 15.734 KHz. When a signal of 1.6 MHz to 3.2 MHz is recorded in conformance with this, the ratio of the maximum frequency 3.2 MHz to the minimum frequency 15.734 KHz becomes 203.4:1. For accurately recording and reproducing a signal of this character, the frequency and phase characteristics must be flat over a very wide frequency range. Therefore, it is very difficult in actual practice to stably and satisfactorily record and reproduce in the horizontal synchronizing signal duration in this manner by using the direct recording method by preventing the MFM signal from existing.

Accordingly, in the recording system of the present invention, as described hereinbefore, the parallel-series conversion circuit 13 causes a rectangular wave signal of a single frequency (for example, of 1.6 MHz in the present embodiment of the invention) from a master clock oscillator 16. The rectangular wave exists in the artificial horizontal synchronizing signal period (the duration of the period corresponding to the terms other than the color burst signal duration in the horizontal blanking duration) by using a duration signal from the synchronizing duration signal generating circuit 19. Further, the parallel-series conversion circuit 13 compresses a digital-modulated information signal in a time base so that the information signal can be present in a time interval other than the artificial synchronizing signal duration. The modulator 14 encodes the compressed digital-modulated information signal through the predetermined modulation system (for example, MFM system) and supplies the encoded information signal which is shown in FIG. 6(A) into the light modulator 15. The interval TH, shown in FIG. 6(A), stands for the artificial horizontal synchronizing signal duration. In this artificial horizontal synchronizing signal duration TH, a pilot signal fp1 or fp2 which has been caused to assume a raised cosine waveform so as not to contain a high-frequency component as indicated in FIG. 6(B) is recorded.

Thus, by the use of the recording system of the present invention, a single-frequency signal is being recorded also in the artificial horizontal synchronizing signal TH. For this reason, the problem encountered in the case where a signal is prevented from existing in that duration as described in conjunction with FIG. 5 does not arise. Furthermore, since the value of the reference voltage is not set, the amplitude of the signal can swing fully from positive to negative, and the signal is recorded and reproduced with a large S/N ratio.

Figure 2:
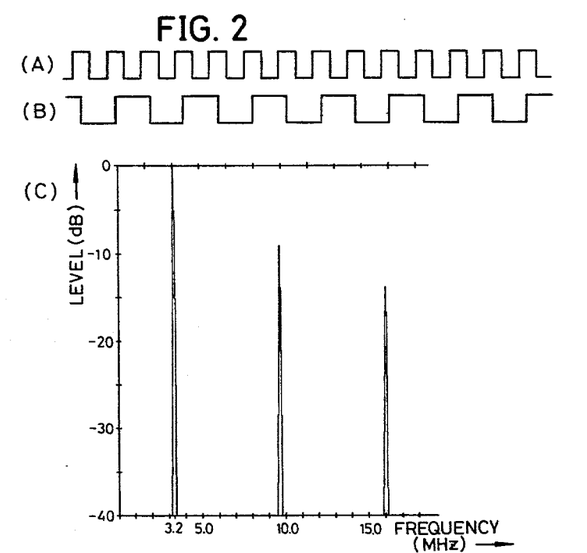
FIGS. 2(A) and 2(B) are waveform charts respectively showing a PCM signal waveform and an MFM signal waveform in the case where the logical values of the PCM signal are all one (unity)
FIG. 2(C) is a graph indicating the frequency spectrum of a modulator output in the same case.
Figure 3:
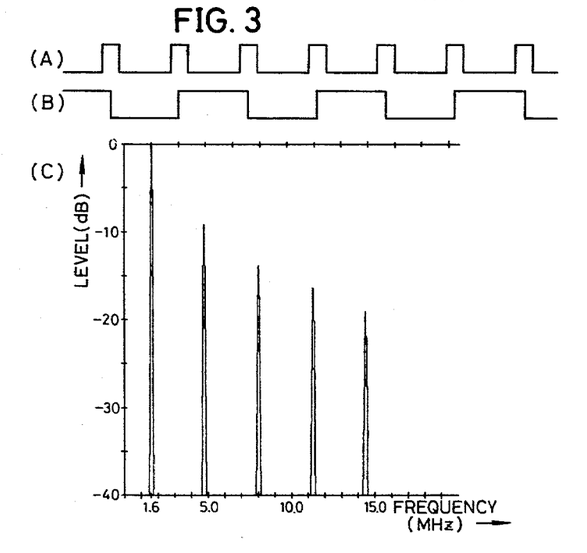
FIGS. 3(A) and 3(B) are waveform charts respectively showing a PCM signal waveform and an MFM signal waveform in the case where the logical values of the PCM signal alternately repeat 1 and 0.
FIG. 3(C) is a graph indicating the frequency spectrum of the modulator output in the same case as in FIGS. 3(A) and 3(B)

A further advantageous feature is that, since the frequency of the signal recorded in the artificial horizontal synchronizing signal duration TH is a single frequency, a frequency component lower than the fundamental wave of the single frequency does not exist as described hereinbefore with reference to FIGS. 2 and 3. For this reason, no interference occurs between the single-frequency signal and the pilot signals.

The first embodiment of the disc according to the invention obtained by recording by means of the above mentioned recording system will now be described with reference to FIG. 7. The surface 41 of those parts of the disc 40 in which pits are not formed are planar and are not provided with a guide groove. Pits 42 of the main track are formed in the disc 40 in responsive accordance with the MFM signal. In FIG. 7, only one part of the signal track turns t1, t2, and t3 corresponding to the artificial horizontal synchronizing signal duration in which the signal of the single frequency (1.6 MHz) is recorded on the successions of pits 42.

In the present embodiment of the invention, the pits 42 are so formed that one of the edge lines of each track is substantially coincident with the nearest edge line of the adjacent track. That is, the adjacent tracks t1, t2, t3, . . . are so formed that they are successively contiguous.

At central positions (coinciding with the edge lines of the tracks in the present embodiment of the invention) approximately intermediate between the centerlines of the mutually adjacent tracks t1 and t2, t2 and t3, . . . , pilot signal pits 43 and 44 responsively corresponding to the aforementioned pilot signals of the frequencies fp1 and fp2 are formed.

The bottom face 51 of the stylus has a part of maximum width, which is greater than the track pitch of the disc 40, and an electrode 52 is fixed to the rear face of the stylus at the rear edge of the bottom face 51. As the disc 40 rotates in the arrow direction Y, the reproducing stylus 50 traces relatively along the surface of the disc 40, the electrostatic capacitance between the electrode 52 and an electroconductive layer covering the entire surface of the disc varies in response to the pits 42, whereby the main information signal recorded by the pits 42 is reproduced.

At the same time, the pilot signals of frequencies fp1 and fp2 recorded by the pits 43 and 44 are also reproduced by the electrode 52. In the case where the center of the electrode 52 deviates from the centerline of the track, a level difference occurs in the reproduced pilot signals, and tracking servo operation is carried out by a control circuit.

A signal previously recorded on the disc 40 and subsequently picked up as feeble variations of electrostatic capacitance by the above mentioned reproducing stylus 50 is converted into an electric signal by a prior art technique. Then one portion of this electric signal is introduced through an input terminal 61, passed through an amplifier 62, and supplied respectively to a specific frequency detection circuit 63 and a gate circuit 64.

The specific frequency detection circuit 63 has, in parallel connection with respect to the input, a band-pass filter for filtering only the frequency component of the rectangular wave of the single frequency inserted and recorded in the artificial horizontal synchronizing signal duration of the recorded rectangular wave of the main track and a band-eliminating filter for suppressing only this single frequency component. The specific frequency detection circuit 63 generates pulses obtained by comparing the levels of the output signals of these filters as gate pulses for opening the gate circuit 64 only in a duration corresponding to the artificial horizontal synchronizing signal duration in the reproduced signal. By this operation, the reproduced signal from the amplifier 62 is led out through the gate circuit 64, to which these gate pulses are applied, only in the time interval corresponding to the artificial horizontal synchronizing signal duration and is supplied to a tracking control signal generating circuit 65.

This tracking control signal generating circuit 65 comprises two band-pass filters for respectively separating signals fp1 and fp2 for tracking, two detection circuits for respectively detecting the output signals of these band-pass filters, a differential amplifier supplied with the output signals of these detection circuits, and a switching circuit for alternately switching the transmission paths from the two detection circuits to the differential amplifier every one-revolution period of the disc 40 in response to the aforementioned third reference signal. This tracking control signal generating circuit 65 produces as output a tracking control signal, which is sent from the differential amplifier to an output terminal 66. This tracking control signal is applied to a moving mechanism (not shown) for moving the reproducing stylus 50 in the radial direction of the disc in a manner such that the reproducing stylus continually follows and traces along the centerline of the main track on the disc.

Even during the time interval in which the reproducing stylus 50 is carrying out normal tracking tracing on the disc 40 constituting one embodiment of the information signal recording medium according to the present invention, in the artificial horizontal synchronizing signal duration, the rectangular wave of single repeated frequency recorded along the main track and signals fp1 and fp2 for tracking recorded along the sub-track on both or one lateral side contiguous to the main track being traced are simultaneously reproduced. However, since the rectangular wave has been selected to have a repeated frequency which does not contain component quantities of the frequency bands of the signals fp1 and fp2 for tracking, there is no occurrence of mutual interference between this reproduced rectangular wave and the reproduced signals fp1 and fp2 for tracking.

On one hand, during the time interval in which the reproducing stylus 50 reproduces a duration other than the artificial horizontal synchronizing signal duration of a signal already recorded along the main track, signal components of the frequency bands of the signals fp1 and fp2 for tracking are contained in the signal reproduced from the main track. However, since the signals fp1 and fp2 for tracking are not recorded along the sub-tracks, there is no occurrence of mutual interference whatsoever between the signal reproduced from the main track and the reproduced signals for tracking. Moreover, in this reproduction duration, gate pulses are not generated even when the frequency components of the signals for tracking in the signal reproduced from the main track of a time interval other than the artificial horizontal synchronizing signal duration are introduced. Therefore, tracking control operation can be carried out in a normal manner without adverse effect thereon.

In the recording system of the present invention illustrated in FIG. 1, the signal recorded in the artificial horizontal synchronizing signal duration need not be a rectangular wave of a single repeated frequency but may be a rectangular wave of small frequency fluctuation or some other signal which may be considered to be one of a single repeated frequency.

In this connection, provided that the pilot signals have very little effect on the MFM signal, and the low-frequency components can be removed satisfactorily by means of a filter in the reproducing system, recording may be carried out in a duration or period other than the artificial horizontal synchronizing signal duration. In this case, of course, a signal which will not produce an interference frequency component in a pilot signal frequency band such as the above mentioned single-frequency signal is recorded on the main track in the artificial horizontal synchronizing signal duration.

Further, this invention is not limited to these embodiments but various variations and modifications may be made without departing from the scope of the invention.

What is claimed is:

1. A system for recording both information and pilot signals directly on recording medium, said system comprising:

means for generating a rectangular waveform signal of a single and specific frequency;

means for generating an artificial synchronizing signal having a duration which is fixed in every specific period responsive to the rectangular waveform signal;

means responsive to the artificial synchronizing signal for generating a duration signal which is equivalent to the duration of an artificial synchronizing signal;

means for generating pilot signals for tracking control, said pilot signals having substantially no frequency component which is approximately equal to the frequency of the rectangular waveform signal;

means for positioning the rectangular waveform within the duration of the artificial synchronizing signal and for time compressing a pulse code modulated or delta modulated digital information signal, so that the digital information signal exists in a time interval other than within the duration of the artificial synchronizing signal;

modulator means for encoding the compressed digital information signal and for generating the digital information signal successively; and means for recording the digital information signal and the rectangular waveform signal along a main track on a recording medium and the pilot signals along pilot signal tracks which are contiguous to the main track.

2. An information signal recording system as claimed in claim 1 in which the means for generating said pilot signal generates a plurality of pilot signals in response to the artificial synchronizing signal and only one of said pilot signals having a single frequency component during time intervals corresponding to the duration of the artificial synchronizing signal.

3. A system for recording information and pilot signals directly on recording medium as claimed in claim 1 in which the rectangular waveform signal of the specific frequency is a rectangular waveform signal of a single frequency which is higher than the frequencies of the pilot signals.

4. A system for recording information and pilot signals directly on recording medium as claimed in claim 1 in which the information signal is an audio signal.

5. A system for recording information and pilot signals directly on recording medium as claimed in claim 1 in which the specific period is a period corresponding to one horizontal scanning period of a standard color television video signal, and the duration of the artificial synchronizing signal corresponds to the time interval which remains after a subtraction of a time interval in which a color-burst signal exists from the duration of the horizontal synchronizing signal of the color television video signal.

6. A system for recording information and pilot signals directly on recording medium, said system comprising:

means for generating a rectangular waveform signal of a single and specific frequency;

means responsive to said rectangular waveform signal for generating an artificial horizontal synchronizing signal which is synchronized in every horizontal scanning period of a standard television video signal;

means responsive to the artificial horizontal synchronizing signal for generating a duration signal which is equivalent to the duration of an artificial horizontal synchronizing signal;

means for generating first, second and third pilot signals for enabling a tracking control, said first and second pilot signals having frequencies which differ alternately during every one-revolution period of a recording medium, and said third pilot signal being recorded at a switching position where the first pilot signal and the second pilot signal alternate, and means for adjusting the frequencies of those three pilot signals into a region other than the vicinity of the frequency of the rectangular waveform signal;

means for positioning the rectangular waveform signal within the duration of the artificial horizontal synchronizing signal and for time compressing a pulse code modulated or delta modulated digital audio signal so that the digital audio signal exists in a time interval other than the artificial horizontal synchronizing signal duration;

means comprising a specific modulating system for encoding the compressed audio digital signal and for generating the digital audio signal successively; and means for recording the digital audio signal and the rectangular waveform signal along a main track on a recording medium and for respectively recording the first and the second pilot signals alternately along pilot signal tracks which are contiguous to the recording medium and for recording the third pilot signal at the switching point of the first and the second pilot signals.

* * * * *